INVENTOR.
Roger H. Stohlquist
By: Olson & Trexler attys.

Jan. 2, 1962 R. H. STOHLQUIST 3,015,303
APPARATUS FOR PROCESSING CAN ENDS
Filed June 1, 1959 5 Sheets-Sheet 2

INVENTOR.
Roger H. Stohlquist
By: Olson & Trexler attys.

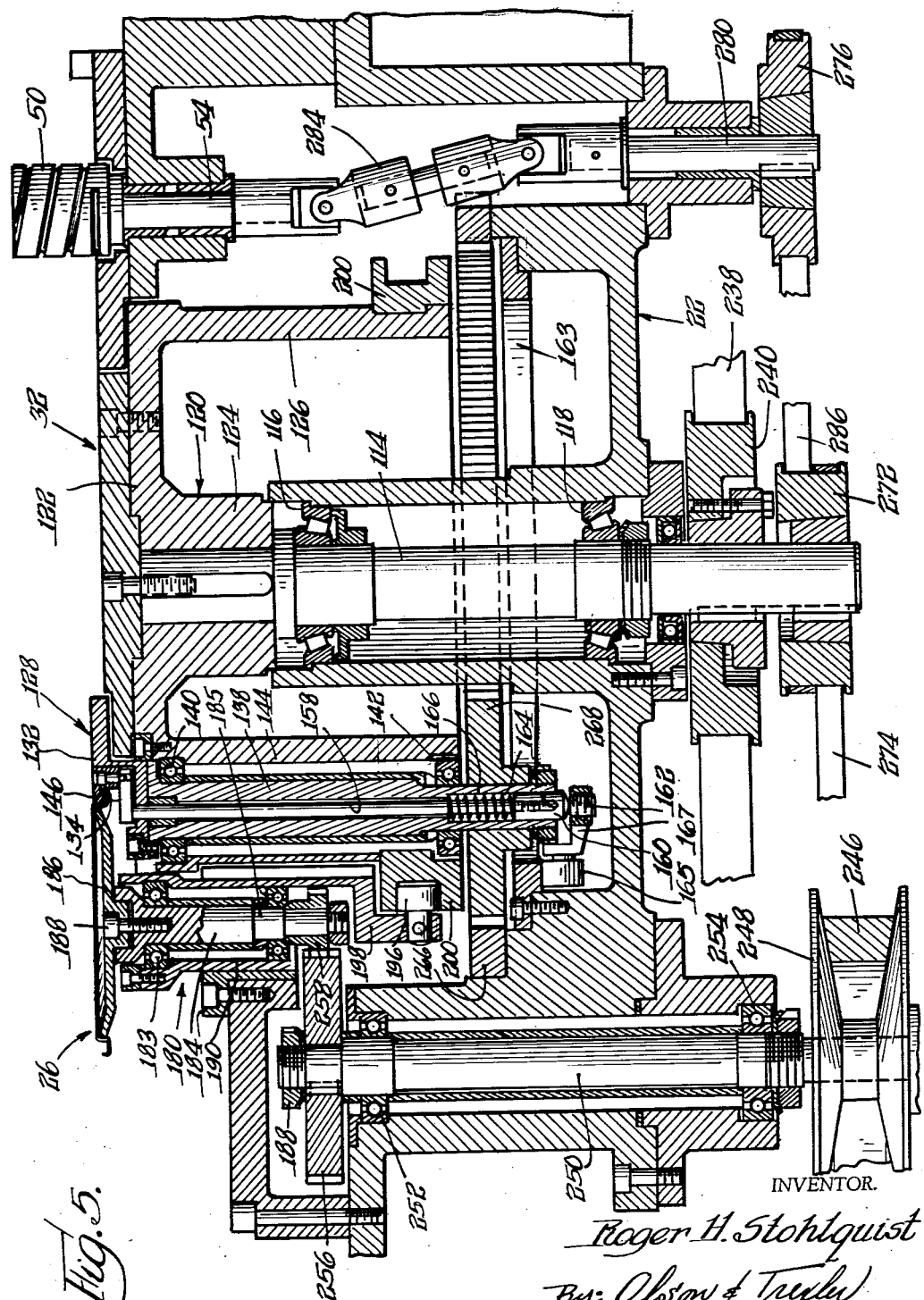

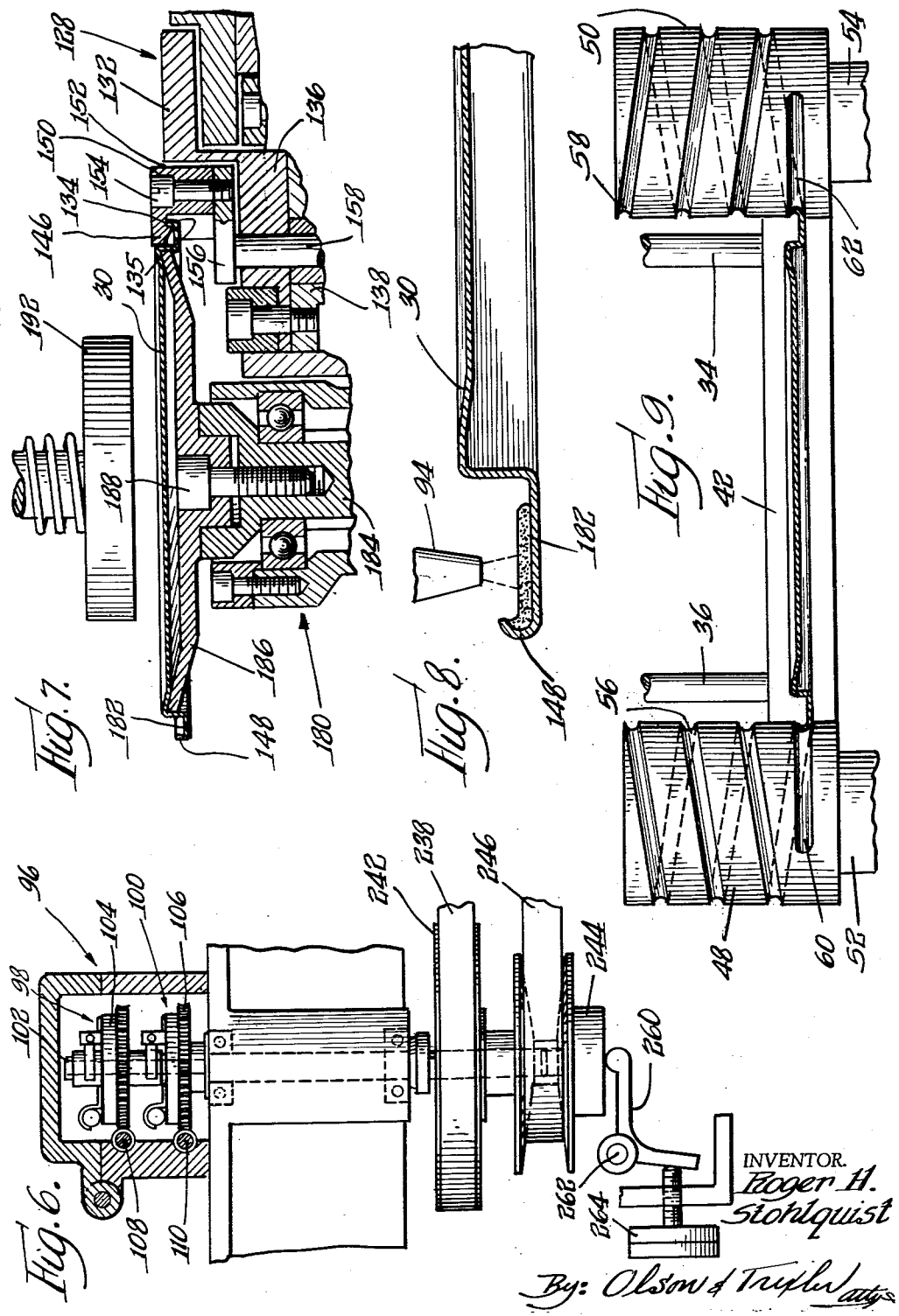

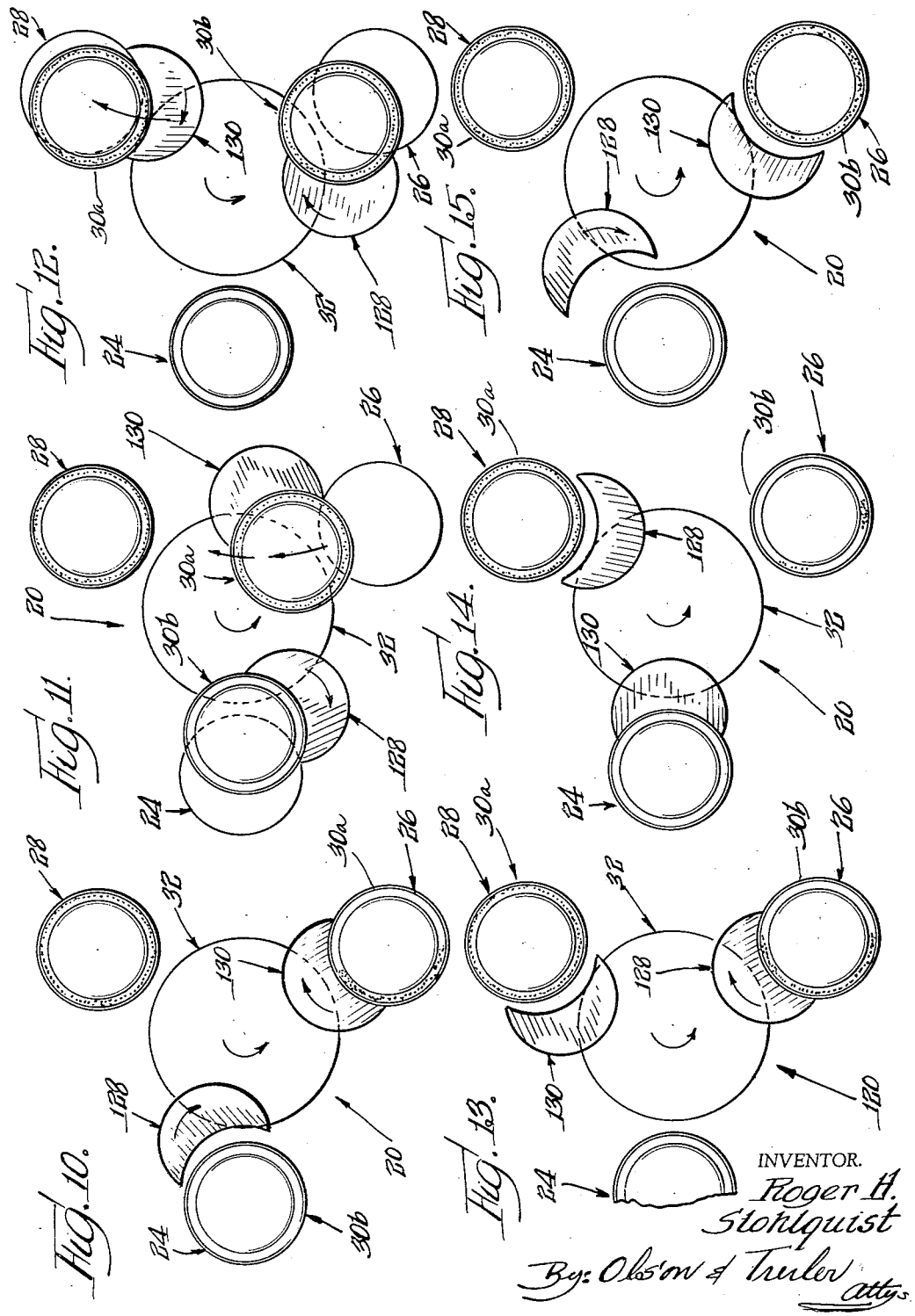

United States Patent Office 3,015,303
Patented Jan. 2, 1962

3,015,303
APPARATUS FOR PROCESSING CAN ENDS
Roger H. Stohlquist, Rockford, Ill., assignor to W. F. and John Barnes Company, Rockford, Ill., a corporation of Illinois
Filed June 1, 1959, Ser. No. 817,248
13 Claims. (Cl. 118—318)

The present invention relates to a novel apparatus for processing can lids and the like, and more particularly to a novel apparatus for applying a sealing compound to can lids or ends.

In accordance with the present practice for producing cans and the like, can bodies are usually provided with soldered side seams and the ends are subsequently applied to the bodies with rolled end seams. Usually a latex base sealing compound is applied to the marginal portions of the can ends before application to the bodies so as effectively to seal the end seams of the finished can. Machinery has been developed so that the can bodies and ends may be produced and assembled at high speeds, but considerable difficulty has been encountered in attempting to apply an annular band of sealing compound to can ends at speeds comparing favorably with those of the producing and assembling machinery. As a result, production rates may, in certain instances be limited by the output of an apparatus which serves to apply the sealing compound to can ends, or in order to overcome this limitation on production, a plurality of sealing compound applying machines may be provided with resulting increases in machinery costs and floor space requirements.

It is an important object of the present invention to provide a novel apparatus for applying sealing compound and the like to can ends or similar workpieces at relatively high speeds.

A more specific object of the present invention is to provide a novel apparatus for applying sealing compound and the like to can ends or similar workpieces at a high production rate, which apparatus is of a compact construction so as not to require an undue amount of floor space.

Still a further object of the present invention is to provide a novel apparatus of the above described type which may be readily adjusted so as to obtain desired variations in the application of sealing compound and the like to the workpieces.

Still another important object of the present invention is to provide a novel apparatus of the above described type which is constructed so that workpieces or can ends are successively advanced from a feeding station to a sealing compound applying station and then to a stacking station, which apparatus is constructed so that the can ends or workpieces are continuously positively retained or controlled so as to minimize any possibility of improper handling of the workpieces.

Still another object of the present invention is to provide a novel apparatus of the above described type which incorporates rotary, non-reciprocatory, dynamically balanced means for transferring can ends between fixed supply, working and stacking or discharge stations.

A further object is to provide an apparatus for processing workpieces or can ends which is constructed so that a major portion of the time required for each rotation of the transferring means is utilized for processing the workpieces and only a minor portion of such time is used for transporting the workpieces whereby increases in production may be obtained.

A further object is to provide a novel apparatus of the type discussed above which may be readily adjusted for operating at different speeds.

Other objects and advantages of the present invention will become apparent from the following description and the accompanying drawings wherein:

FIG. 5 is an enlarged fragmentary sectional view taken generally along line 5—5 in FIG. 2;

FIG. 6 is an enlarged fragmentary partial sectional view taken along line 6—6 in FIG. 2;

FIG. 7 is an enlarged fragmentary sectional view taken along a portion of the same line as FIG. 5 and shows a part of the apparatus in greater detail;

FIG. 8 is an enlarged partial sectional view showing the manner in which sealing compound is applied to a workpiece or can end;

FIG. 9 is an enlarged fragmentary and partial sectional view taken generally along line 9—9 in FIG. 2; and FIGS. 10 through 15 are diagrammatic views showing successive steps in the operation of the apparatus.

Figure 1:
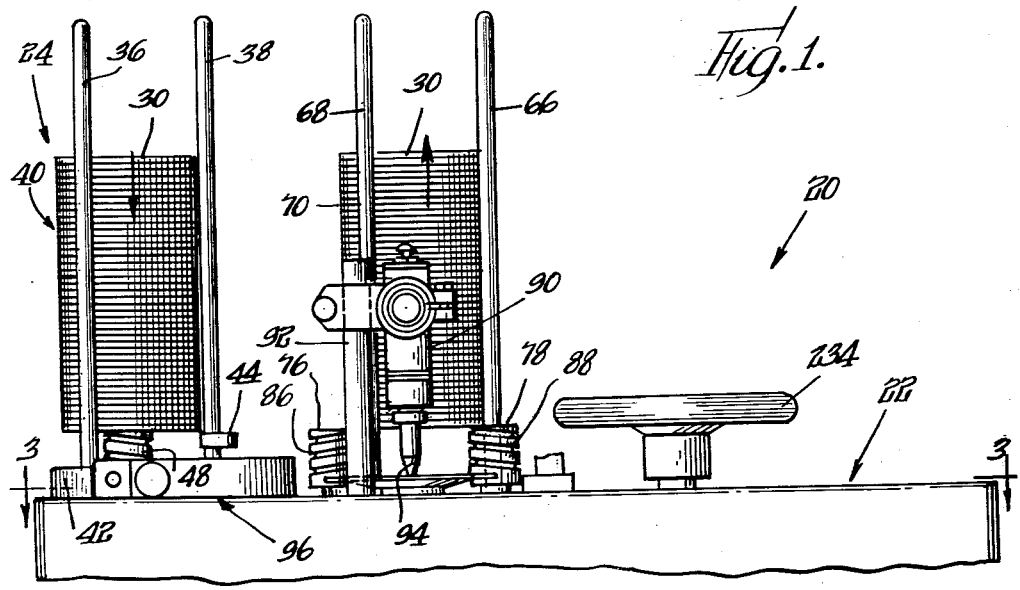
FIG. 1 is a fragmentary elevational view showing an apparatus incorporating features of the present invention.
Figure 2:
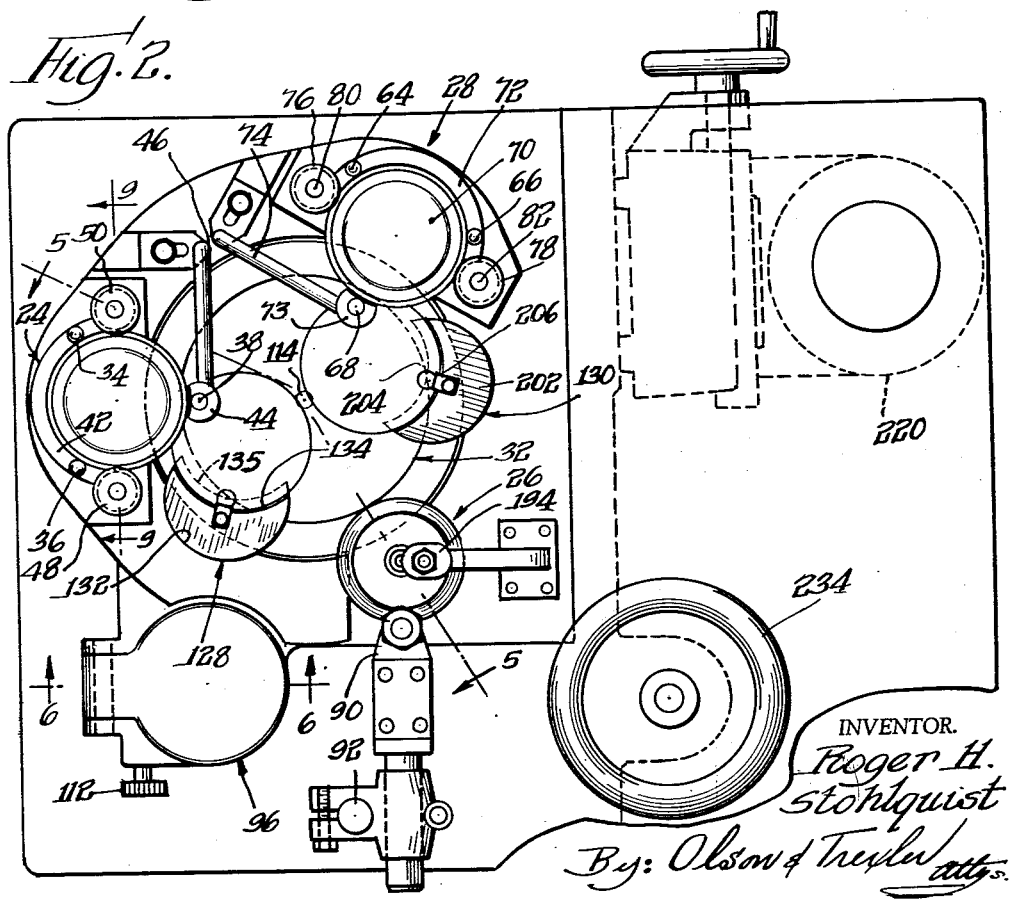
FIG. 2 is a plan view of the apparatus shown in FIG. 1.

Referring now more specifically to the drawings wherein like parts are designated by the same numerals, it is seen that an apparatus 20 incorporating features of the present invention is provided with a suitable base structure 22 on which there are disposed a workpiece or can end feeding station 24, a processing or sealing compound applying station 26 and a workpiece stacking station 28 as shown in FIGS. 1 and 2. As will be described more in detail below, a stack of workpieces or can ends 30 is placed at the feeding station, and the apparatus is provided with means 32 for positively handling and transferring successive can ends from the feeding station to the compound applying station 26 and subsequently from the compound applying station to the stacking station 28.

Referring particularly to FIGS. 1, 2 and 9, it is seen that the apparatus is provided with a plurality of upstanding guide rods 34, 36 and 38 for confining the supply or stack 40 of the can ends 30. The rods 34 and 36 are secured to and extend upwardly from an arcuate shoe 42 complementary to the can ends and suitably mounted on the base structure 22. The upstanding guide rod 38, however, is supported by a socket member 44 which is spaced above the base structure by a suitable bracket arm 46 so as to provide clearance for moving elements of the transfer means 32 described below.

In order to feed the can ends 30 one at a time from the stack 40, a pair of upstanding rotatable members 48 and 50 is provided, which members are respectively fixed on or made integral with rotatable shafts 52 and 54 located on opposite sides of the stack 40. The members 48 and 50 are respectively provided with helical grooves 56 and 58 which grooves are adapted to accommodate edges of successive can ends at the bottom of the stack 40 as shown best in FIG. 9. It will be appreciated that when the separating members 48 and 50 are rotated in the proper direction, successive can ends will be separated from the bottom of the stack 40 and advanced to a lower position from which they will be carried by the transferring means 32. In FIG. 9, lower portions 60 and 62 of the grooves 56 and 58 are substantially annularly formed in a plane perpendicular to the axes of the rotatable members 48 and 50 rather than helically formed so as to retain a can end in a desired lowered position until it is picked up by the transferring means 32.

The stacking station 28 is provided with means quite similar to the structure at the feeding station but operated in a reverse manner so as to receive can ends from the transferring means 32. More specifically, a plurality of upstanding guide rods 64, 66 and 68 are provided for confining a stack 70 of processed workpieces or can ends 30. The guide rods 64 and 66 are fixed to a suitable arcuate shoe 72 mounted on the base structure while the rod 68, like the above mentioned rod 38, is supported above the base structure by a suitable socket member 73 fixed on the end of a bracket arms 74. Rotatably threaded or helically grooved members 76 and 78 are provided at opposite sides of the stack 70 and are respectively mounted on shafts 80 and 82 which are driven in the manner described below. The members 76 and 78 are provided with grooves 86 and 88 which are identical to but oppositely helically formed with respect to the grooves in the feeding members 48 and 50 described above so that the rotatable members 76 and 78, which may be designated stacking members, serve to raise processed can ends received from the transferring means 32 to the bottom of the stack 70. It will be appreciated that a workman may manually supply can ends to the feed chute provided by the upstanding rods 34–38 and manually remove processed can ends from the stacking chute defined by the upstanding rods 64–68, but if desired suitable aparatus, not shown, may be provided for supplying can ends to and removing processed can ends from the apparatus 20.

As shown in FIGS. 1, 2 and 8, a material or sealing compound applying unit 90 is supported by a suitable standard 92 at the station 26 so that the tip of a discharge nozzle 94 of the unit is located slightly above the position a peripheral portion of a can end 30 will occupy when the can end is properly located at the compound applying station. The unit 90 is connected with a suitable source of sealing compound, not shown. The unit 90 may be of a type which is commercially available so that the details thereof form no part of the invention claimed herein and need not be described. It suffices to state that the unit 90 is preferably of a type which is electropneumatically operated. Timer means 96 shown in FIGS. 2 and 6 is provided and electrically connected with the unit 90 so that the unit will dispense sealing compound intermittently and when a can end is properly positioned at the station 26.

As shown in FIG. 6, the timer means 96 includes a pair of switch units 98 and 100, each of which has one contact element mounted on and rotatable with a shaft 102. The switch units which control starting and stopping of the sealing compound dispensing operation, respectively have second contact elements carried by worm wheels 104 and 106. It will be appreciated that by arcuately adjusting the worm wheels 104 and 106 and the switch contact elements carried thereby, the timing of the sealing compound dispensing operation can be varied. Worm shafts 108 and 110 are respectively provided for adjusting the worm wheels, which shafts have hand knobs fixed to their outer ends, such as the hand knob 112 shown in FIG. 2. The rotational speed of the shaft 102 may also be adjusted in the manner described below for varying the timing of the sealing compound dispensing operation.

The can end transferring and handling means 32 which is constructed in accordance with features of the present invention is shown in FIGS. 2, 5 and 7. In addition, a portion of this means and the manner in which it functions is diagrammatically shown in FIGS. 10 through 15. Referring particularly to FIGS. 2 and 5, it is seen that the means 32 comprises a central shaft 114 rotatably mounted within the base structure 22 by suitable upper and lower combined radial and thrust bearing units 116 and 118. A carrier 120 is fixed to the upper end of the shaft 114 for rotation therewith, which carrier has an upper end or flange portion 122 radiating from a central hub portion 124 and integrally or otherwise connected with a depending cylindrical skirt section 126. It will be noted that the feeding, compound applying and stacking stations are equally spaced around the carrier 120, and workpiece or can lid engaging and retaining chucks 128 and 130 are mounted on the carrier 120 so that they will successively become aligned with successive pairs of said stations as the carrier is rotated in the manner described fully below. The chuck 128 serves to transfer successive can ends from the feeding station to the compound applying station 26, and the chuck 130 subsequently serves to transfer the can ends from the station 26 to the stacking station 28.

While the chucks 128 and 130 perform the different functions mentioned in the preceding paragraph, the details of their construction are substantially identical so that only the chuck 128 and its associated actuating elements are completely disclosed in FIGS. 2, 5 and 7. More specifically, it is seen that the chuck 128 comprises a shoe 132 having an arcuate face 134 (see FIGS. 2 and 7) from which a ledge 135 projects (see FIGS. 2 and 7) against which a peripheral portion of a can end may be clamped. As shown in FIGS. 5 and 7, the shoe 132 is provided with a depending portion 136 which also projects laterally outwardly from the arcuate face 134 for connection to an upper end of a spindle 138 which is not concentric with the arc of the surface 134. The spindle 138 is rotatably supported by suitable upper and lower bearing units 140 and 142 in a tubular portion 144 of the carrier skirt 126. While only one tubular portion 144 is shown in the portion of the carrier illustrated, it is to be understood that a similar tubular portion and associated elements are provided for rotatably supporting a spindle associated with the chuck 130.

Figure 3:
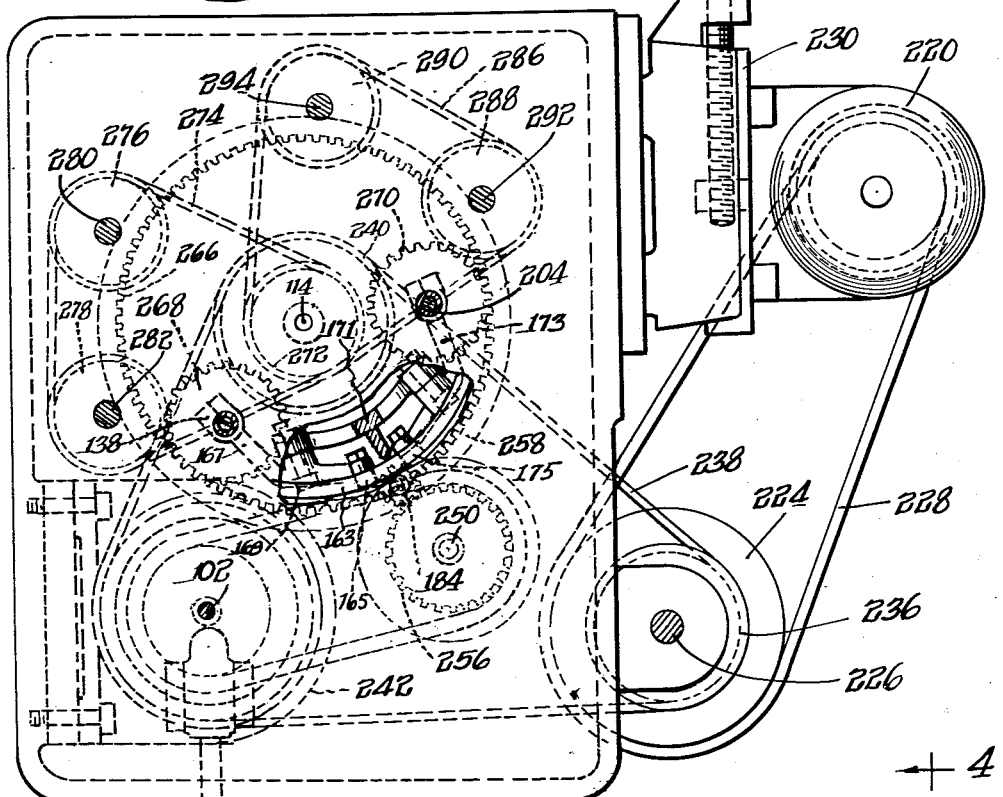
FIG. 3 is a sectional view taken generally along line 3—3 in FIG. 1.

In order releasably to clamp a can end 30 against the arcuate face 134 of the shoe 132, the chuck structure is provided with a hook-like finger 146 adapted to engage over an upturned rim 148 of a can end 30. The finger 146 projects from a block 150 slideably disposed in a slot 152 formed in the shoe 132. The block 150 is secured by means of a screw 154 to an arm 156 which is fixed to the upper end of an actuating rod 158 extending through the hollow spindle 138. Means is provided for shifting the rod 158 so as to lower the finger 146 to clamp a can rim against the shoe 132 or to raise the finger 146 so as to release the can rim. This means comprises a spring 164 compressed between a tip member 160 fixed to the lower end of the rod 158 and an end of a counterbore 166 provided in the lower end of the spindle 138. A ring cam 163 is fixed for engagement by a cam follower 165 carried by one end of a lever 167 having an adjustable pad 162 at its opposite end for engaging the member 160 and raising the rod 158 and the clamp finger 146 to release a can end. As shown in FIG. 3, the lever 167 is pivotally supported on a pin 169 carried by a specially formed depending portion 171 of the cylindrical section 126 of the carrier. It will be appreciated that the cam structure is such that the clamping finger 146 is actuated in timed relationship with the rotation of the carrier and so that it is raised and lowered to release and clamp a can end at the proper time as the chuck 128 passes the various stations.

The means 32 is provided with a mechanism 180 at the station 26 for receiving can ends from the chuck 128 and rotating the ends beneath the compound dispensing nozzle 94 so that the sealing compound is distributed in an even annular ring 182 around the marginal portion of a can end as indicated in FIGS. 7 and 8. This mechanism comprises a spindle 184 rotatably mounted by suitable bearing units 183 and 185 in a tubular slide member 190 mounted for vertical sliding movement in the base structure 22. A can end accommodating pad 186 is fixed to the upper end of the spindle by any suitable means such as a screw 188. In order to retain a can end securely on the pad 186 after the can end has been released from the chuck 128, a spring biased clamping pad 192 is supported by suitable mounting means 194 slightly above the pad 186 as shown in FIGS. 2 and 7, and means is provided for raising the spindle 184 so that the can end will be clamped between the pads 186 and 192. As shown in FIG. 5, the means for raising and lowering the spindle 184 comprises a cam follower 196 fixed to a depending extension 198 of the spindle supporting slide 190 and engaging an annular cam track 200 which is fixed to and moves with the depending skirt portion 126 of the carrier 120. It will be appreciated that the cam 200 is formed so that the pad 186 is lowered to receive a can end from the chuck 128 and then is raised during the sealing compound applying operation and finally is again lowered to deliver the processed can end to the stacking chuck 130.

As indicated above, the stacking or unloading chuck 130 and its associated elements are substantially identical to the chuck 128 and its associated spindle and actuating elements so that the chuck 130 need not be described in detail. However, it will be noted that the chuck 130 comprises a shoe 202 having an arcuate surface for conforming to a can end margin and mounted on a spindle 204 as indicated in FIG. 2. In addition, a clamping finger or element 206 is provided, which element is substantially identical to the clamping finger 146 and is actuated in substantially the same manner under the control of a lever 173 (FIG. 3) similar to the above described lever 167 and pivotally carried by the portion 171 of the carrier. The lever 171 carries a cam follower 175 which engages the cam 163 slightly in advance of the follower 165, as shown in FIG. 3. It will be appreciated that the arrangement of the chuck 130 and the actuating lever therefor is such that the chuck 130 serves to pick up can ends released from between the clamping pads 186 and 192 at the sealing compound applying station and to release the can ends at the stacking station.

Figure 4:
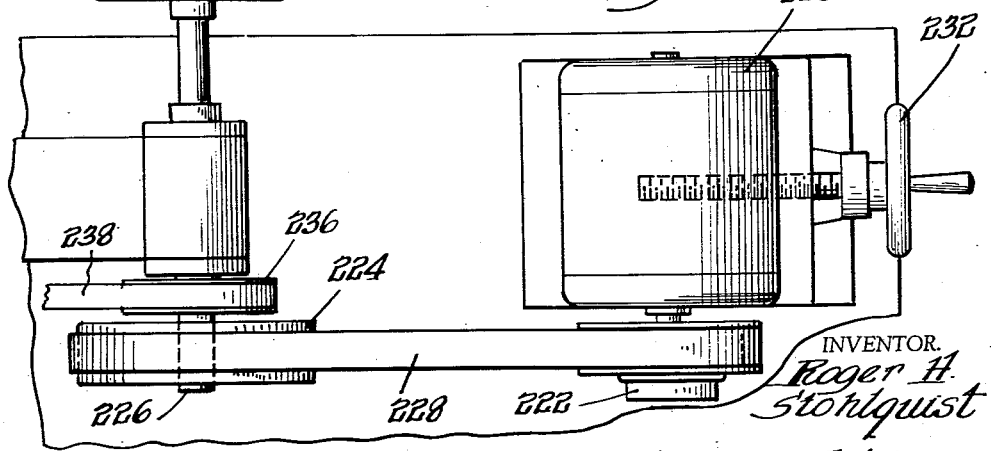
FIG. 4 is a fragmentary elevational view as seen from line 4—4 in FIG. 3.

The apparatus is provided with means for driving the various spindles and rotatable elements described above in timed relationship, which drive means is shown best in FIGS. 3—4—6. This means comprises an electric motor 220 having a variable speed pulley 222 on the rotor shaft thereof for driving a pulley 224 fixed on a rotatable shaft 226 by means of an endless belt 228. The motor 220 is mounted on a slide 230 which may be adjusted by means of a hand wheel and screw rod assembly 232 for adjusting the belt 228 for varying the production rate. Preferably, a hand wheel 234 is provided on the main drive shaft 226 so that the apparatus may be turned by hand, whenever desired, in order to facilitate the various necessary adjustments. A second pulley 236 is fixed on the main drive shaft 226, and this pulley has teeth which drive an endless toothed belt 238 which engages and drives a toothed pulley 240 fixed on the central spindle 114. In addition, the endless belt 238 extends around and drives a toothed pulley 242 fixed on the timer shaft 102, as shown best in FIGS. 3 and 6. Thus, it is seen that the timer shaft will be driven in a predetermined timed relationship with respect to the rotation of the central spindle 114 and, thus, the carrier 120 and the workpiece handling chucks mounted thereon.

As shown in FIGS. 3, 5 and 6, the spindle 184 at the sealing compound applying station is driven in timed relationship with the timer shaft 102. This is accomplished by providing a second pulley 244 on the shaft 102, which pulley drives a belt 246, which, in turn, drives a pulley 248 fixed to a shaft 250 rotatably supported in the base structure 22 by means of upper and lower bearing assemblies 252 and 254. A gear 256 is fixed to the upper end of the shaft 250, which gear meshes with and drives a pinion 258 fixed to the lower end of the spindle 184 which serves to support and rotate a can end during the sealing compound applying operation. Preferably, the pulleys 244 and 248 which may be of known construction, are constructed so that the effective diameters thereof may be adjusted for varying the speed of rotation of a can end being processed. In order to aid in the adjustment of the pulley 244, a stop member 260 in the form of a bell crank pivoted on a pin 262 is provided for engaging and locating the lower section of the pulley 244, and an adjustment screw 264 is provided for positioning the stop member 260.

The chucks 128 and 130 are rotated relative to and in timed relationship with the carrier 120 in the manner described more fully below. In order to accomplish this rotation, an internal ring gear 266 is mounted in and fixed with respect to the base structure 22 and meshes with and drives planet gears 268 and 270 respectively fixed to the chuck spindles 138 and 204, as shown in FIGS. 3 and 5.

The helically grooved or threaded feeding and stacking rollers at the feeding and stacking stations are also driven in timed relationship with the rotation of the carrier. More specifically, as shown in FIGS. 3 and 5, a double toothed pulley 272 is fixed on the central spindle 114, and a first belt 274 extending around this pulley also extends around and drives toothed pulleys 276 and 278 fixed on shafts 280 and 282, respectively. As shown in detail in FIG. 5, the shaft 280 is connected with and drives the shaft 54 of the feeding roll 50 by means of a universal joint structure 284 since, in the embodiment shown, the shaft 280 is necessarily axially offset from the shaft 54. The shaft 278 is similarly connected with and drives the shaft 52 of the feeding roll 48. A second toothed belt 286 extends around and is driven by the toothed pulley 272, and this belt drives toothed pulleys 288 and 290 fixed on shafts 292 and 294, respectively, as shown in FIG. 3. These shafts are connected with and drive the shafts 80 and 82 of the stacking rollers 76 and 78. As will be understood, suitable universal coupling means similar to the universal coupling unit 284 may be provided for providing driving connections between the shafts.

The manner in which the apparatus operates will now be described with particular reference to FIGS 10 through 15. With the elements of the apparatus in the positions indicated diagrammatically in FIG. 10, a first can end 30a has been processed at the compound applying or processing station 26 and this can end has been released from the opposing clamping pads 186 and 192 at the processing station and positively gripped in the chuck 130. At the same time the chuck 128 is approaching the feeding station 24 and is conditioned for receiving and gripping a lowermost can end 30b at the feeding station. Upon continued rotation of the carrier and the chucks in the directions indicated by the arrows, the processed can end 30a is carried by the chuck 130 toward the stacking station 28 as indicated in FIGS. 11 and 12, and the chuck 128 picks up the can end 30b and carries it toward the processing station 26. As the elements of the apparatus move from the position shown in FIG. 12 to the position shown in FIG. 13, the chuck 130 places the can end 30a between the stacking rollers 76 and 78 and then releases the can end so that it is elevated by the stacking rollers to the bottom of the stack 70 of processed can ends. When the chuck 128 reaches the position shown in FIG. 13, the clamping finger thereof is raised to release the can end 30b which is then gripped by and rotated between the clamping pads 186 and 192 for receiving the application of an annular band of sealing compound in the manner described above. During the time interval required for applying sealing compound to the can ends, the carrier 120 and the chucks continue to rotate through the positions shown in FIGS. 14 and 15 and back to the starting position shown in FIG. 10. It is to be noted that the construction of the cam means which serve to actuate the chuck clamping fingers is such that when the stacking chuck 130 passes the feeding station, as shown in FIG. 14, it will not pick up or interfere with a can end and the supply stack 40. Similarly, the feeding chuck 128 will not engage or interfere with processed can ends in the stack 70 at the station 28.

While the preferred embodiment of the present invention has been shown and described herein, it is obvious that many structural details may be changed without departing from the spirit and scope of the appended claims. For example, the embodiment disclosed herein includes only a single processing station and associated workpiece clamping and rotating means and compound applying means. However, it is contemplated that the apparatus may be modified by including a plurality of processing, feeding and stacking stations around a single central carrier, and a plurality of sets of feeding and stacking chucks on the carrier for servicing each of the procession stations.

The invention is claimed as follows:

1. An apparatus for successively processing a plurality of workpieces comprising a feeding station, a processing station and a discharge station, endless carrier means extending past all of said stations, first chuck means mounted on said carrier means and movable past all of said stations for delivering successive workpieces from said feeding station to said processing station, second chuck means on said carrier means and movable past all of said stations for delivering processed workpieces from said processing station to said discharge station, and means at said processing station for processing workpieces after the workpieces have been delivered thereto by said first mentioned chuck means and before the workpieces are transferred therefrom by said second mentioned chuck means.

2. An apparatus for successively processing a plurality of workpieces comprising a feeding station, a processing station, and a discharge station equally spaced around a predetermined circle, endless carrier means disposed within said circle and continuously movable past all of said stations in a predetermined direction, first chuck means mounted on said carrier means and movable past all of said stations for delivering successive workpieces from said feeding station to and releasing the workpieces at said processing station, second chuck means mounted on said carrier means at a location spaced from said first chuck means rearwardly of said first chuck means an amount approximately equal to two thirds of the circumference of said carrier means for transferring processed workpieces from said processing station to said discharge station, means at said processing station for processing workpieces, and timer means actuated in timed relationship with said carrier means for controlling said processing means.

3. An apparatus, as defined in claim 2, which includes means at said feeding station for supporting a stack of workpieces to be processed, a pair of oppositely disposed rollers having axes substantially parallel to a longitudinal axis of said stack and including helical groove means engageable with margins of successive workpieces in the stack for separating successive endmost workpieces from the stack and positioning said workpieces for association with said first chuck means, and means for driving said rollers in timed relationship with said carrier means.

4. An apparatus, as defined in claim 2, which includes means at said discharge station for retaining a stack of processed workpieces, a pair of rollers disposed at opposite sides of said last mentioned means with axes substantially parallel to the longitudinal axis of said stack, said rollers including helical groove means engageable with margins of processed workpieces delivered by said second chuck means for advancing such workpieces against an end of said stack, and means for driving said rollers in timed relationship with said carrier means.

5. In an apparatus for successively processing a plurality of workpieces, the combination comprising a feeding station, a processing station, a discharge station, endless continuously movable carrier means extending past all of said stations, first chuck means mounted on said carrier means and movable past all of said stations only for delivering successive workpieces from said feeding station to and releasing the workpieces at said processing station, and second chuck means mounted on said carrier means and movable past all of said stations only for delivering processed workpieces from said processing station to said discharge station.

6. An apparatus, as defined in claim 5, wherein said first chuck means comprises means for positively clamping a workpiece, and means for actuating said clamping means in timed relationship with the movement of the carrier means for causing the clamping means to grip a workpiece at said feeding station and release the workpiece at said processing station.

7. An apparatus, as defined in claim 6, wherein said second chuck means comprises means for positively clamping a workpiece, and means for actuating said last mentioned clamping means for gripping a workpiece at said processing station and for releasing the workpiece at said discharge station.

8. An apparatus for successively processing a plurality of generally circular workpieces comprising a feeding station, a processing station, a discharge station, endless continuously movable carrier means extending past all of said stations, chuck means mounted on said carrier means and including means having an arcuate workpiece engageable surface movable around an endless path of travel intersecting said stations, means for actuating and rotating said chuck means relative to the carrier means for moving said arcuate surface into meshing relationship with workpieces at said stations and for retaining successive workpieces at one of said stations and delivering the workpieces to and releasing the workpieces at a second of said stations, and means at said processing station for processing workpieces thereat.

9. An apparatus for successively processing a plurality of workpieces comprising a feeding station and a processing station, endless continuously movable carrier means movable past said stations, chuck means mounted on said carrier means and including means having an arcuate surface substantially complementary to generally circular workpieces to be processed and movable around an endless path of travel intersecting said stations, and means for rotating and actuating said chuck means relative to said carrier means for moving said arcuate surface into meshing relationship with workpieces at said stations and for delivering successive workpieces from said feeding station to said processing station and releasing the workpieces at the processing station.

10. An apparatus, as defined in claim 9, wherein said chuck means includes means for positively clamping a workpiece against said arcuate surface during delivery of the workpiece from said feeding station to said processing station.

11. An apparatus for processing a plurality of generally circular workpieces comprising a feeding station, a processing station, a discharge station, endless continuously movable carrier means movable past all of said stations, first chuck means mounted on said carrier means and including means having an arcuate surface movable around and in a path of travel intersecting said stations, second chuck means mounted on said carrier means and including means having a second arcuate surface movable around said path of travel, means for rotating and actuating each of said chuck means relative to said carrier means for moving said arcuate surfaces into meshing relationship with workpieces at all of said stations and for causing said first chuck means to deliver workpieces from said feeding station to said processing station and said second chuck means to deliver workpieces from said processing station to said discharge station.

12. An apparatus, as defined in claim 11, which includes means disposed at said processing station for receiving workpieces successively from said first chuck means and gripping and turning the workpieces during processing thereof and for subsequently releasing the workpieces for transfer by said second chuck means.

13. An apparatus, as defined in claim 12, wherein said means at said processing station comprises a spindle driven in timed relationship with said carrier means, a workpiece engageable pad carried by said spindle, a second workpiece engageable pad supported oppositely from said first pad, and means for axially shifting said spindle and said first pad for clamping a workpiece between said first and second pads during processing of the workpiece.

References Cited in the file of this patent

UNITED STATES PATENTS

| | | |
|---|---|---|
| 2,287,356 | Newman | June 23, 1942 |
| 2,732,315 | Birkland | Jan. 24, 1956 |